US009843892B2

(12) United States Patent
Hietalahti et al.

(10) Patent No.: US 9,843,892 B2
(45) Date of Patent: Dec. 12, 2017

(54) METHOD AND APPARATUS FOR PROVIDING EMERGENCY CALL CELL SELECTION

(75) Inventors: Hannu Petri Hietalahti, Kiviniemi (FI); Rune Adolf Lindholm, Sottunga (FI)

(73) Assignee: Nokia Technologies Oy, Espoo (FI)

( * ) Notice: Subject to any disclaimer, the term of this patent is extended or adjusted under 35 U.S.C. 154(b) by 205 days.

(21) Appl. No.: 13/882,864

(22) PCT Filed: Nov. 16, 2010

(86) PCT No.: PCT/IB2010/055200
§ 371 (c)(1),
(2), (4) Date: May 1, 2013

(87) PCT Pub. No.: WO2012/066384
PCT Pub. Date: May 24, 2012

(65) Prior Publication Data
US 2013/0225120 A1    Aug. 29, 2013

(51) Int. Cl.
*H04W 4/02* (2009.01)
*H04W 4/22* (2009.01)
*H04W 48/00* (2009.01)
*H04W 36/00* (2009.01)
*H04W 48/16* (2009.01)
(Continued)

(52) U.S. Cl.
CPC .......... *H04W 4/021* (2013.01); *H04W 4/22* (2013.01); *H04W 36/0083* (2013.01); *H04W 48/00* (2013.01); *H04W 48/16* (2013.01); *H04W 48/18* (2013.01); *H04W 48/20* (2013.01); *H04W 64/00* (2013.01); *H04W 76/007* (2013.01)

(58) Field of Classification Search
CPC ....... H04W 4/021; H04W 4/22; H04W 48/00; H04W 64/00; H04W 36/0083; H04W 76/007; H04W 48/18; H04W 48/20; H04W 48/16
USPC ....................................................... 455/404.2
See application file for complete search history.

(56) References Cited

U.S. PATENT DOCUMENTS 5,794,149 A * 8/1998 Hoo ............................. 455/438
5,974,320 A * 10/1999 Ward et al. .................. 455/437
(Continued)

FOREIGN PATENT DOCUMENTS

CN    1835638 A    9/2006
EP    1104975 A2   6/2001
(Continued)

OTHER PUBLICATIONS

International Search Report received for corresponding Patent Cooperation Treaty Application No. PCT/IB2010/055200, dated Aug. 16, 2011, 4 pages.

Primary Examiner — Marcos Torres
(74) Attorney, Agent, or Firm — Mintz Levin Cohn Ferris Glovsky and Popeo, P.C.

(57) ABSTRACT

A method for providing cell selection for emergency calls may include receiving position information indicative of a location of a mobile terminal relative to a geographic border, and causing modification of a candidate list of cells or public land mobile networks for cell selection or public land mobile network selection based on the position information and a position of the cells relative to the geographic border. A corresponding computer program product and apparatus are also provided.

21 Claims, 6 Drawing Sheets

(51) Int. Cl.
    *H04W 48/18*      (2009.01)
    *H04W 48/20*      (2009.01)
    *H04W 64/00*      (2009.01)
    *H04W 76/00*      (2009.01)

(56) References Cited

U.S. PATENT DOCUMENTS

| | | | |
|---|---|---|---|
| 6,230,017 B1 * | 5/2001 | Andersson et al. | 455/456.6 |
| 6,240,284 B1 * | 5/2001 | Bugnon et al. | 455/404.1 |
| 6,633,555 B1 * | 10/2003 | Lu | H04M 15/00 |
| | | | 370/331 |
| 8,213,942 B2 * | 7/2012 | Likar et al. | 455/446 |
| 8,989,674 B2 * | 3/2015 | Findlay | H04W 36/0088 |
| | | | 370/252 |
| 9,179,499 B1 * | 11/2015 | Fang | H04W 88/06 |
| 2003/0181208 A1 | 9/2003 | Lobinger et al. | |
| 2005/0107082 A1 | 5/2005 | Gunaratnam et al. | |
| 2005/0153705 A1 | 7/2005 | Gramakov et al. | |
| 2006/0211402 A1 | 9/2006 | Hofmann | |
| 2006/0229087 A1 | 10/2006 | Davis, III et al. | |
| 2009/0176474 A1 | 7/2009 | Bajko | |
| 2010/0195525 A1 * | 8/2010 | Eerolainen | 370/252 |
| 2010/0255807 A1 | 10/2010 | Umatt et al. | |
| 2013/0059599 A1 * | 3/2013 | Bergqvist | H04W 4/02 |
| | | | 455/456.1 |

FOREIGN PATENT DOCUMENTS

| | | |
|---|---|---|
| EP | 1855417 A1 | 11/2007 |
| WO | WO-2008102252 A1 | 8/2008 |
| WO | WO-2008137354 A1 | 11/2008 |
| WO | 2009022967 | 2/2009 |
| WO | 2009108811 | 9/2009 |

* cited by examiner

METHOD AND APPARATUS FOR PROVIDING EMERGENCY CALL CELL SELECTION

RELATED APPLICATION

This application was originally filed as PCT Application No. PCT/IB2010/055200 filed Nov. 16, 2010.

TECHNOLOGICAL FIELD

Embodiments of the present invention relate generally to wireless communication technology and, more particularly, relate to a method and apparatus for providing emergency call cell selection.

BACKGROUND

During network configuration or other network planning exercises, a neighbor list may be defined that identifies a plurality of cells that may be capable of supporting communications between a user equipment (UE) and the network. A neighbor list may identify cells in various manners including, for example, by scrambling codes associated with the cells such as in a Code Division Multiple Access (CDMA) based network or by information regarding frequency in use by the cells in a Time Division Multiple Access (TDMA) based network. This list may be utilized, for example, to perform handover of a cell to another cell, or perform cell reselection from one serving/camped cell to another serving/camped cell.

As currently defined by 3rd Generation Partnership Project (3GPP), handover and cell reselection procedures are limited to cells in a neighbor list that includes a list of available cells. Public land mobile network (PLMN) selection is performed via the available cells, based on the knowledge of which PLMNs are represented by the available cells and the priority among the available PLMNs. Thus, both cell selection and PLMN selection are typically performed based on radio propagation and subscription related criteria without regard for geographic borders (e.g., a border such as a state, national or international border). While this selection method does consider radio propagation and the preference between available PLMNs, it completely ignores the geographic location of the UE.

During routine call routing, the existence of geographic borders is irrelevant since call routing is based on the location of the destination and not based on the location of the originator. However, for certain situations (such as, for example, emergency calls) the existence of geographic borders may become important. In this regard, many countries have shared emergency call handling between regional Public Safety Answering Points (PSAPs), with each PSAP being responsible for dispatching emergency services in a certain geographic area. Such PSAP organizations are applicable within each country and typically not able to dispatch emergency rescue across the border to neighboring countries.

Near a physical border, a UE user could physically be located in a first country, but could be served by a cell that is located in a second country. If the user has an emergency situation and makes an emergency call for assistance, the caller's location may typically be considered in two steps. First, the call routing may be used to identify the PSAP that corresponds to the cell that is serving the user. Second, the PSAP operator may dispatch emergency response units to the address or location of the user. In a situation where the user is actually in the first country, but is served by a cell in the second country, the serving network will route the call to the responsible PSAP of the second country, which will receive the call. The dispatch of emergency response units may be complicated by the fact that emergency calls cannot typically be routed internationally.

BRIEF SUMMARY

A method, apparatus and computer program product are therefore provided to enable the provision of cell selection and PLMN selection that may consider geographic borders to assist in cell selection in certain situations such as for emergency call routing. Accordingly, for example, when an emergency call is made near a geographic border, the call may be routed to a PLMN of the country in which the user is physically located.

In one example embodiment, a method of providing emergency call cell selection or PLMN selection is provided. The method may include receiving position information indicative of a location of a mobile terminal relative to a geographic border, and causing modification of a candidate list of cells or PLMNs for cell selection or available PLMN selection based on the position information and a position of the cells relative to the geographic border.

In another example embodiment, a computer program product for providing emergency call cell selection or PLMN selection is provided. The computer program product includes at least one non-transitory computer-readable storage medium having computer-executable program code instructions stored therein. The computer-executable program code instructions may include program code instructions for receiving position information indicative of a location of a mobile terminal relative to a geographic border, and causing modification a candidate list of cells or PLMNs for cell selection or PLMN selection based on the position information and a position of the cells relative to the geographic border.

In another example embodiment, an apparatus for providing emergency call cell selection or PLMN selection is provided. The apparatus may include at least one processor and at least one memory including computer program code. The at least one memory and the computer program code may be configured to, with the at least one processor, cause the apparatus to perform at least receiving position information indicative of a location of a mobile terminal relative to a geographic border, and causing modification of a candidate list of cells or PLMNs for cell selection or PLMN selection based on the position information and a position of the cells relative to the geographic border.

In another example embodiment, an apparatus for providing emergency call cell selection is provided. The apparatus may include means for receiving position information indicative of a location of a mobile terminal relative to a geographic border, and means for causing modification of a candidate list of cells or PLMNs for cell selection or PLMN selection based on the position information and a position of the cells relative to the geographic border.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
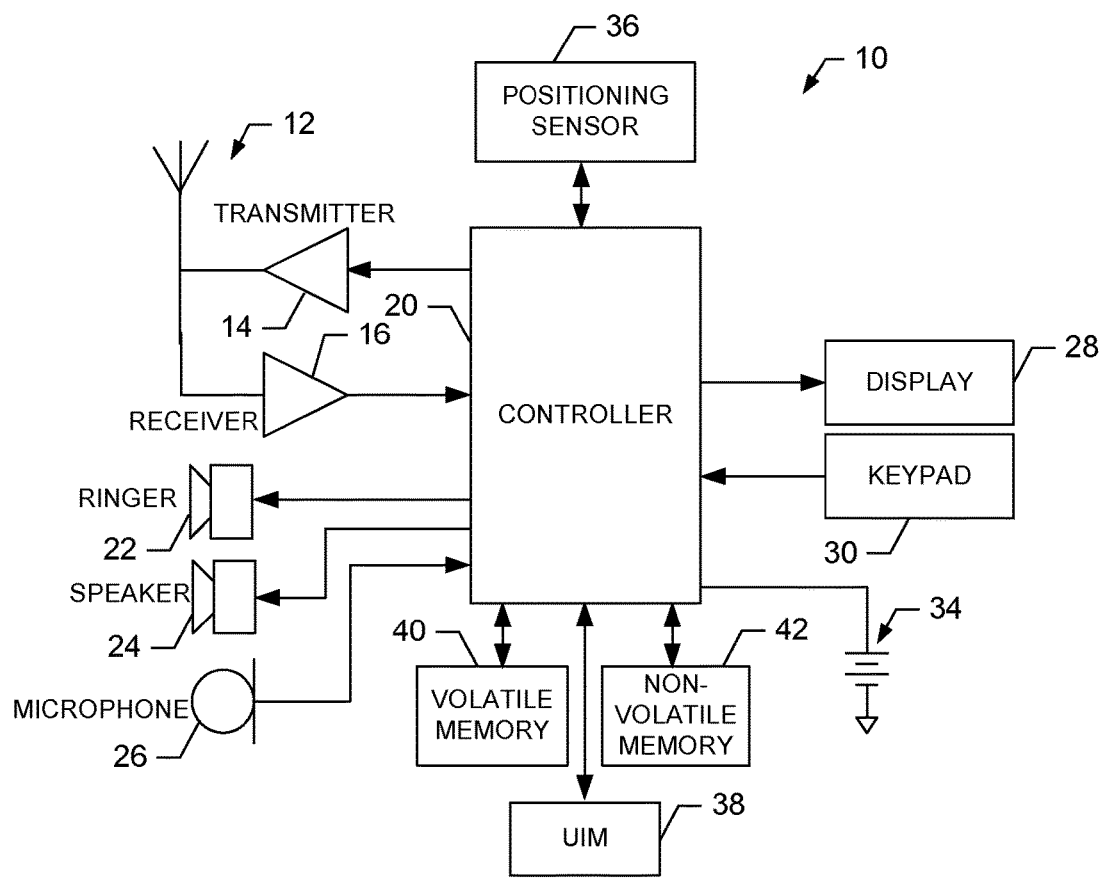
FIG. 1 is a schematic block diagram of a mobile terminal that may employ an example embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

As indicated above, call routing near geographic borders may be problematic in certain situations such as when emergency calls are being placed where the user is physically on one side of the border, but being served by a cell on the other side of the border. Cell selection and PLMN selection are extensively defined in the 3GPP specification. However, no accommodation is currently made for emergency calls in the situation described above. With many people living on one side of a particular border and working or otherwise repeatedly traveling to the other side of the border, the occurrence of the user's phone being registered to a PLMN in another country is common in border regions. There are two main ways the geographic border complication may occur. As one example, the user may not actually cross the border, but may temporarily lose coverage by the serving PLMN that is on the same side of the border as the user and the user's UE may select a PLMN from the other side of the border. As another example, the user may cross the border, but the UE may still remain registered in a PLMN on the other side of the border. Other example cases also exist.

The method and apparatus of example embodiments therefore address issues where it may be advantageous to guide cell and PLMN selection based on geographic location. For example, a phone in a particular geographic location (typically near a geographic border), may obtain information indicative of its geographic position and use that information to bias the selection of cells and PLMNs that are known to be in the same particular geographic location (or administrative area) with respect to the geographic border. Thus, example embodiments do not necessarily bias selection to the nearest cell or PLMN since numerous cells may overlap and thus, many cells may be otherwise considered to be in the same general location as the user. Instead, example embodiments may use current position information of the user relative to a geographic border and bias cell and PLMN selection to those candidates that have the same position as the user relative to the geographic border. As indicated above, this may be particularly useful in emergency situations since it is clearly advantageous to have emergency calls routed to a PSAP that is on the same side of the border as the user. However, example embodiments need not necessarily be practiced in connection with emergency calls in all cases even though emergency calls represent one very clear example where example embodiments may be useful.

FIG. 1, one example embodiment of the invention, illustrates a block diagram of a mobile terminal 10 (or UE) that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, numerous types of mobile terminals, such as personal digital assistants (PDAs), mobile telephones, pagers, mobile televisions, gaming devices, laptop computers, cameras, video recorders, audio/video players, radios, positioning devices, e.g., global positioning system (GPS) devices, or any combination of the aforementioned, and other types of voice and text communications systems, may readily employ embodiments of the present invention.

The mobile terminal 10 may include an antenna 12, or multiple antennas, in operable communication with a transmitter 14 and a receiver 16. The mobile terminal 10 may further include an apparatus, such as a controller 20 or other processing device, which provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136, time division multiple access (TDMA), global system for mobile communication (GSM), and IS-95 code division multiple access (CDMA), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as the Evolved UMTS Terrestrial Radio Access Network (E-UTRAN), with fourth-generation (4G) wireless communication protocols or the like. As an alternative, or additionally, the mobile terminal 10 may be capable of operating in accordance with non-cellular communication mechanisms. For example, the mobile terminal 10 may be capable of communication in a wireless local area network (WLAN) or other communication networks described below in connection with FIG. 2.

In some embodiments, the controller 20 may include circuitry desirable for implementing audio and logic functions of the mobile terminal 10. For example, the controller 20 comprises one or more digital signal processors and/or one or more microprocessors. The controller may further comprise one or more analog to digital converters, one or more digital to analog converters and/or other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

In addition, the mobile terminal 10 may include a positioning sensor 36. The positioning sensor 36 may include, for example, a global positioning system (GPS) sensor, an assisted global positioning system (Assisted-GPS) sensor, a Bluetooth (BT)-GPS mouse, other GPS or positioning receivers or the like. However, in one exemplary embodiment, the positioning sensor 36 may include a pedometer or inertial sensor. In this regard, the positioning sensor 36 may be capable of determining a location of the mobile terminal 10, such as, for example, longitudinal and latitudinal directions of the mobile terminal 10, or a position relative to a reference point such as a destination or start point. In some embodiments, the mobile terminal 10 may also provide a user interface for the user to indicate the current location for the purpose of cell selection or PLMN selection for emergency situations. In some configurations as e.g. a fixed non-mobile UE could be pre-configured with its location information. Positioning information may then be communicated to a memory of the mobile terminal 10 or to another memory device to be stored as a position history or location information. In this regard, for example, the position history may define a series of data points corresponding to positions of the mobile terminal 10 at respective times. Various events or activities of the mobile terminal 10 may also be recorded in association with position history or location information provided by the positioning sensor.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10. For example, the memories may include an identifier, such as an international mobile equipment identification (IMEI) code, capable of uniquely identifying the mobile terminal 10. Furthermore, the memories may store instructions for determining cell id information. Specifically, the memories may store an application program for execution by the controller 20, which determines an identity of the current cell, e.g., cell id identity or cell id information, with which the mobile terminal 10 is in communication.

Figure 2:
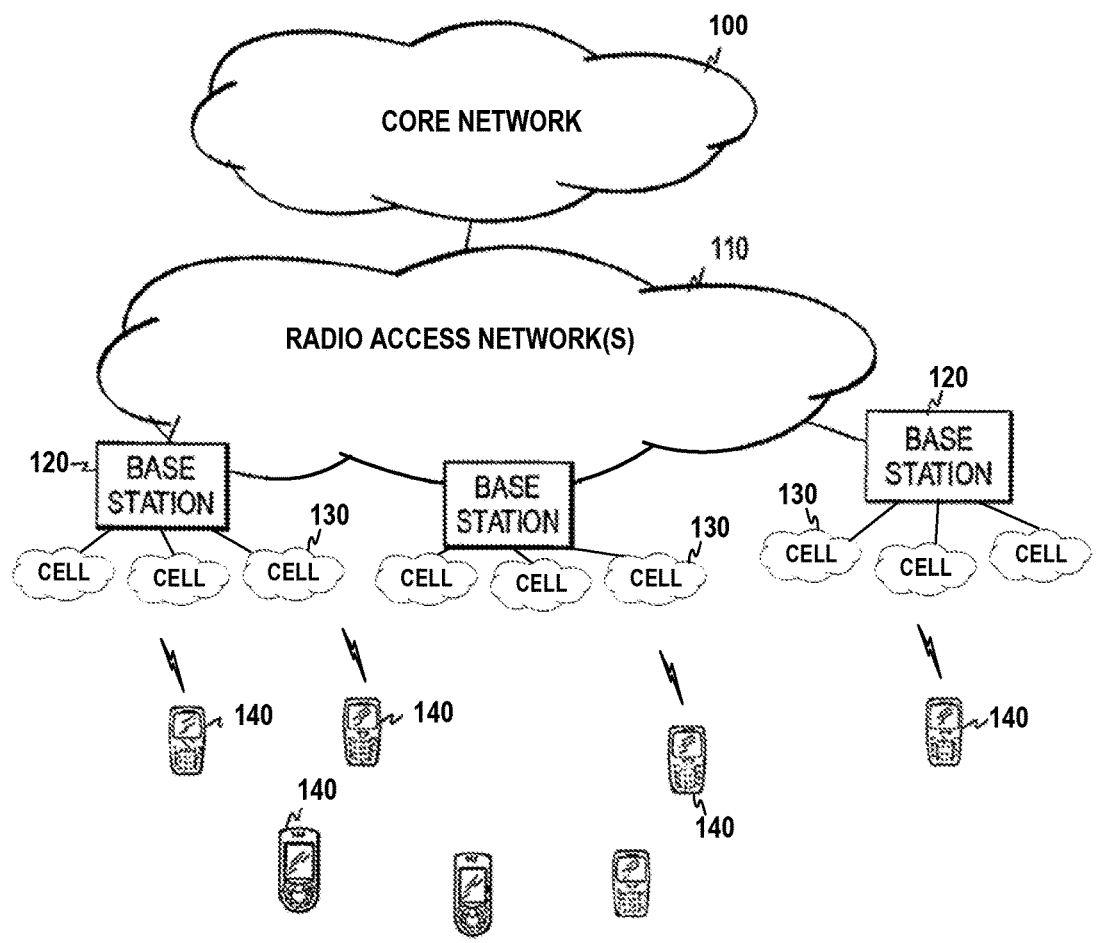
FIG. 2 is a schematic block diagram of a wireless communications system according to an example embodiment of the present invention.

FIG. 2 is a schematic block diagram of a wireless communications system according to an example embodiment of the present invention. Referring now to FIG. 2, an illustration of one type of system that would benefit from embodiments of the present invention is provided. As shown in FIG. 2, a system in accordance with an example embodiment of the present invention may include one or more public land mobile networks (PLMNs) coupled to one or more other data or communication networks—notably a wide area network (WAN) such as the Internet. As shown, each of the PLMNs includes a core network 100 backbone such as the Serving GPRS Support Node (SGSN), the Mobile Switching Centre (MSC) or the Evolved Packet Core (EPC); and each of the core networks and the Internet are coupled to one or more radio access networks 110, air interfaces or the like that implement one or more radio access technologies. As shown, the radio access networks each include one or more base stations 120 (or node B elements), access points or the like, each of which may serve a coverage area divided into one or more cells 130.

In addition, the system includes one or more mobile radio units that may be varyingly known as user equipment (UE) 140, terminal equipment, mobile station, mobile terminal (e.g, mobile terminal 10) or the like. In operation, these UEs may be configured to connect to one or more of the radio access networks 110 according to their particular radio access technologies to thereby access a particular core network of a PLMN, or to access one or more of the other data or communication networks (e.g., the Internet). In various instances, a single UE, a dual-mode or multimode UE, may support multiple (two or more) radio access networks—thereby being configured to connect to multiple radio access networks. For example, a particular UE may support both Global System for Mobile communications (GSM) and Universal Mobile Telecommunications System (UMTS) radio access technologies.

Examples of radio access technologies include 3GPP radio access, Universal Mobile Telephone System (UMTS) radio access UTRAN (Universal Terrestrial Radio Access Network), GSM radio access, CDMA 2000 radio access, Wireless Local Area Networks (WLANs) such as IEEE 802.xx networks (e.g., 802.11a, 802.11b, 802.11g, 802.11n, etc.), world interoperability for microwave access (Wi-MAX) networks, IEEE 802.16, and/or wireless Personal Area Networks (WPANs) such as IEEE 802.15, Bluetooth, low power versions of Bluetooth, ultra wideband (UWB), Wibree, Zigbee or the like. 3GPP radio access technologies may include, for example, 3rd generation (3G) or 3.9G (also referred to as UTRAN Long Term Evolution (LTE) or Super 3G) or E-UTRAN (Evolved UTRAN). Generally, a radio access technology may refer to any 2nd generation (2G), 3G, 4th generation (4G) or higher generation mobile communication technology and their different versions, as well as to any other wireless radio access technology that may be arranged to interwork with such a mobile communication technology.

Figure 3:
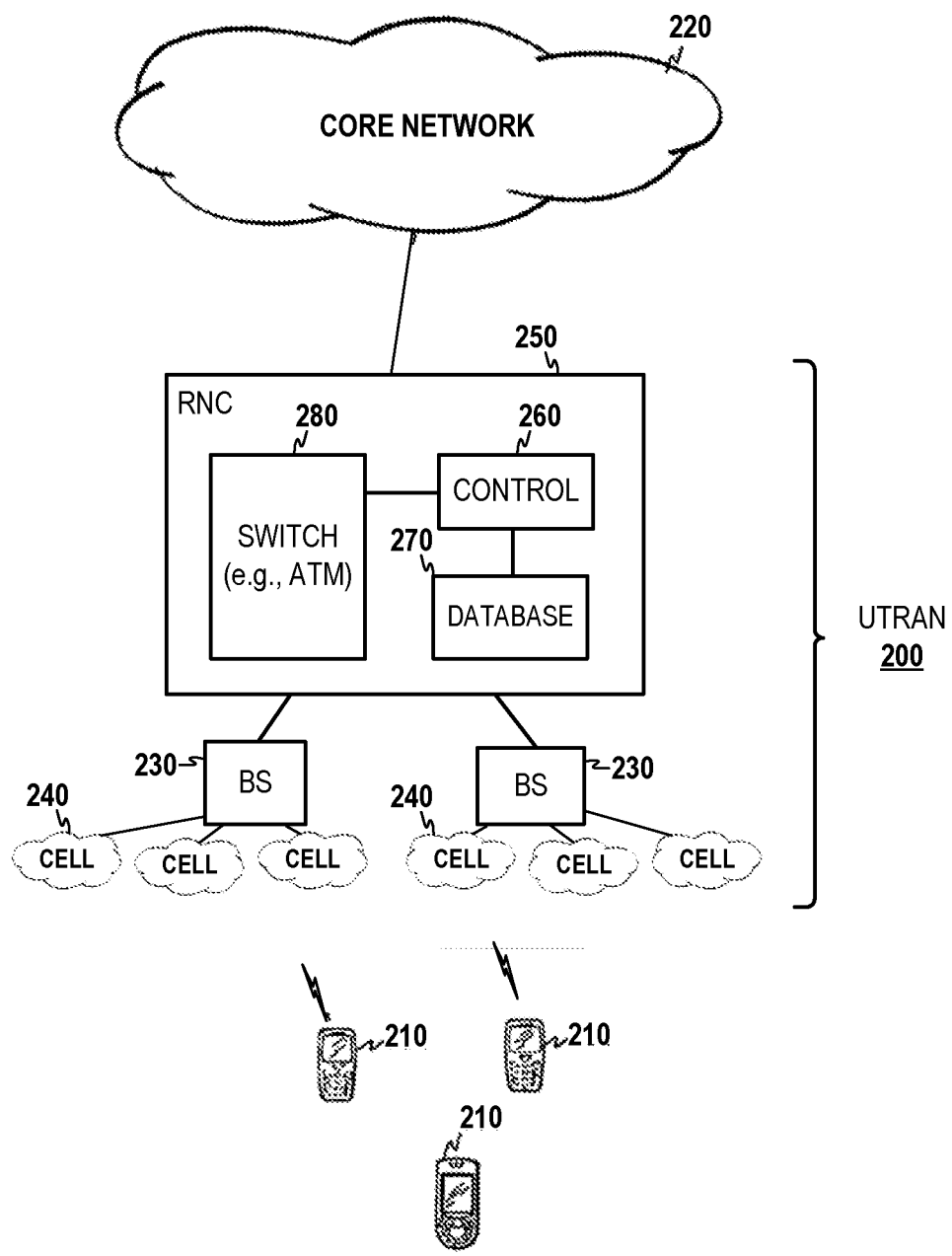
FIG. 3 illustrates a public land mobile network (PLMN) according to an example embodiment of the present invention.

Referring now to FIG. 3, a PLMN including a UTRAN is more particularly illustrated according to various example embodiments of the present invention. In this regard, example embodiments of the present invention may be particularly described with respect to UTRAN. More information on aspects of UTRAN may be found, for example, in 3GPP TS 25.331 v. 10.0.0 (2010-06), entitled: Radio Resource Control (RRC): Protocol Specification (Release 10), the content of which is incorporated by reference in its entirety. It should be understood, however, that example embodiments are known to be applicable on other 3GPP radio access technologies and may be equally applicable to other radio access technologies.

The UTRAN 200, which is one of the 3rd Generation Wireless Mobile Communication Technologies, can carry many traffic types from real-time circuit switched (CS) to Internet Protocol (IP)-based packet switched (PS) traffic. The UTRAN allows connectivity between a UE 210 and core network 220. UMTS may use wideband code division multiple access (WCDMA). The UTRAN contains base stations (BSs) 230, called Node Bs, each of which serves a coverage area divided into cell(s) 240. In accordance with UMTS, pluralities of cells may be grouped such that each coverage area may include more than one cell. Each of these groups of cells may be referred to, for example, as a UTRAN registration area (URA). As shown, UE 210, core network 220, BS 230 and cell 240 are examples of respective ones of UE 140, core network 100, base station 120 and cell 130 of FIG. 1.

The UTRAN 200 may also include radio network controllers (RNCs) 250, each of which may provide control functionalities for one or more Node Bs. A Node B 230 and an RNC can be the same device, although typical implementations have a separate RNC located in a central office serving multiple Node Bs. Despite the fact that they do not have to be physically separated, there is a logical interface between them. The RNC and its corresponding Node Bs are called the radio network subsystem (RNS). There can be more than one RNS present in a UTRAN.

As also shown, a radio access network 110 may more generally include some type of network controlling/governing component, such as the RNC 250 in UTRAN 200, which may be responsible for control of the BSs 230 (e.g., Node Bs) that are connected to the controller. As used herein, the term "network controller" or "network controlling/governing component" may refer to any network element or a set of network elements configured to use inter-radio access technology measurements for a network decision. Such a network controlling/governing component may also include a BS or a Node-B. The network controlling/governing component may include a controller 260, processor or the like programmed to carry out radio resource management and mobility management functions, etc. The controller may be associated with a memory or database 270 for maintaining information required in the management functions. The network controlling/governing component may include a switch unit 280 (such an Asynchronous Transfer Mode (ATM) switch) for switching connection between network elements within the radio access network. The network controlling/governing component may be connected to a Circuit Switched Core Network through e.g., a Mobile Switching Center (MSC), a Media Gateway (MGW) and to e.g., a Serving General Packet Radio Service (GPRS) Support Node (SGSN) in a Packet Switched Core Network.

Figure 4:
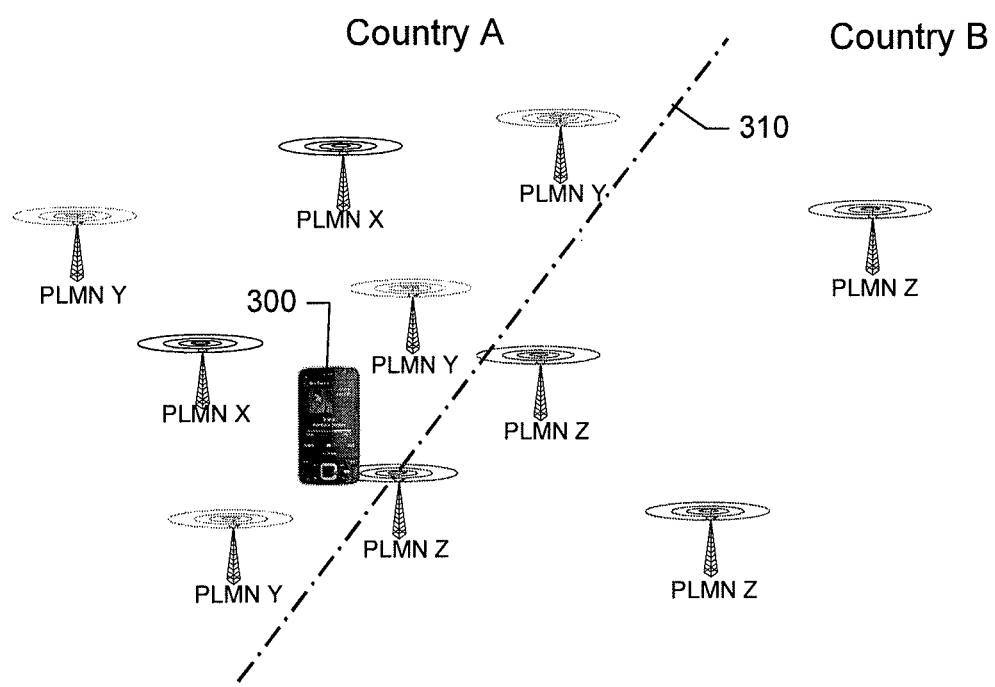
FIG. 4 illustrates a diagram of selectable PLMNs relative to a geographic border according to an example embodiment of the present invention.

As discussed above, in some cases a UE may be located proximate to a geographic border. In such examples, cell and PLMN selection may be guided based on UE location. FIG. 4 illustrates an example of a UE 300 that is located in country A near a geographic border 310 with country B. As shown in FIG. 4, this region of country B may include various cells of PLMN Z, while this region of country A may include numerous cells associated with PLMN X and PLMN Y.

Typically, the home PLMN (HPLMN) of the UE 300 does not matter. The UE 300 typically selects any one of the available cells and camps on it as defined according to the corresponding 3GPP specification. Thus, there is no prohibition against the UE 300 selecting a cell from PLMN Z in country B. Moreover, there may not be any reason to provide any such prohibition when considering normal operating conditions and normal traffic. However, for any local services, for example, if an emergency call is to be placed from the UE 300, it may be desirable to ensure that the call is routed via PLMN X or PLMN Y since these PLMNs are located on the same side of the geographic border 310 as the UE 300.

In an example embodiment, to provide the UE 300 with an opportunity to select a PLMN that is on the same side of the geographic border 310 as the side on which the UE 300 is located. In some cases, the UE 300 may receive location information and use the location information to bias cell selection or PLMN selection. The location information (or position information) may be provided by the positioning sensor 36 of FIG. 1 or from memorized network topology information such as the last registered PLMN, the home PLMN and/or via manual entry by the user based on address, or by any available method. For example, cells associated with PLMNs in the same country (e.g., on the same side of the border) may be preferentially ranked or prioritized for cell selection. However, in some examples, cells associated with PLMNs in other countries (e.g., in this case cells associated with PLMN Z) may be excluded from consideration for cell selection, or prioritized lower in the cell selection process.

In some cases, the location of the UE 300 may be compared to map data to determine proximity to a geographic border. In some embodiments, PLMNs or cells that are close to a geographic border may be known to the UE 300 and only emergency calls attempted to be made in or near such PLMNs or cells may utilize location determination as provided herein to facilitate placement of emergency calls. All other calls may be processed without regard to avoidance of cross border registration situations since calls made from cells that are not known to be proximate to a border are not likely to even create the possibility of cross border registration situations.

Figure 5:
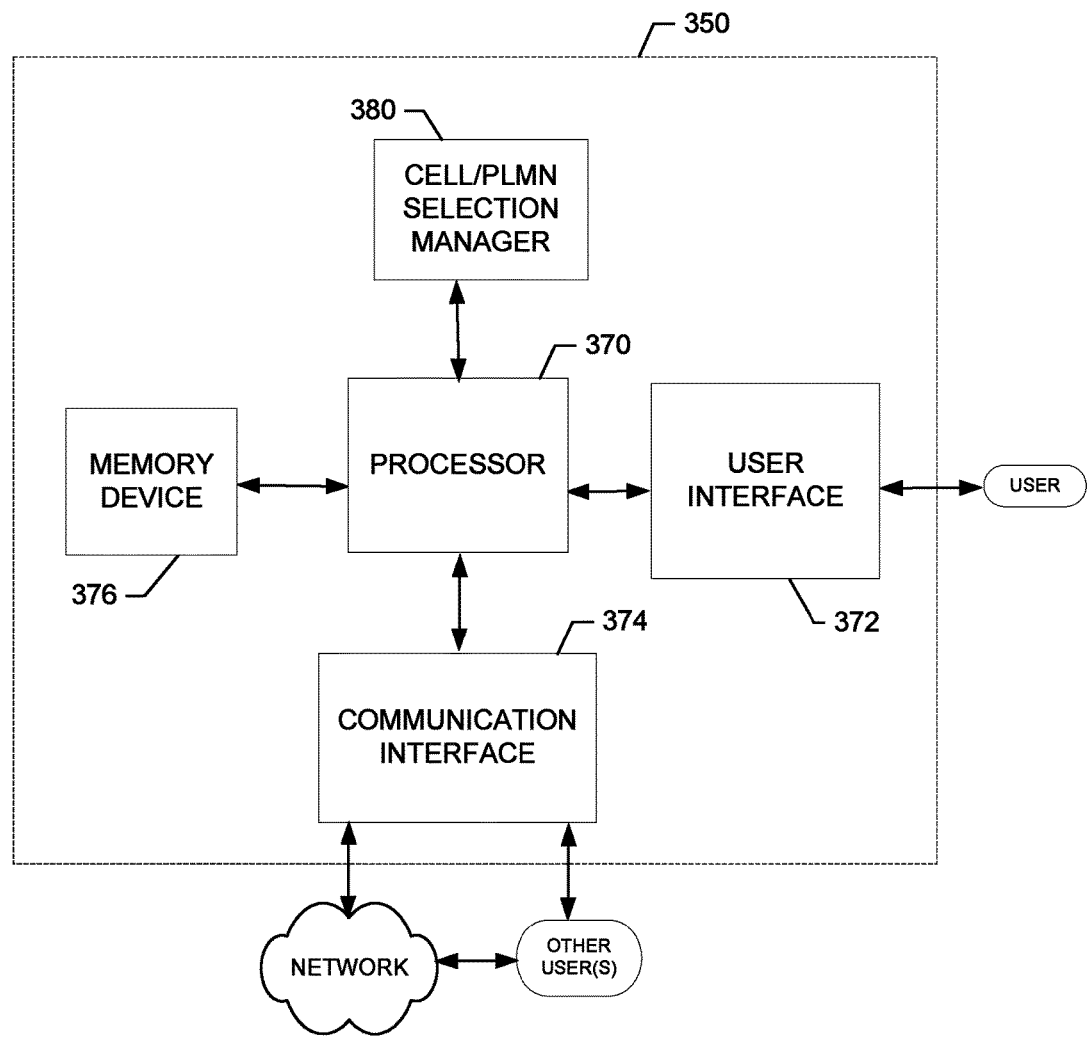
FIG. 5 illustrates a block diagram of an apparatus for providing emergency call cell selection according to an example embodiment of the present invention.

Referring now to FIG. 5, an apparatus for providing geo-predictive streaming services is provided. The apparatus 350 may include or otherwise be in communication with one or more processors such as processor 370, a user interface 372, one or more communication interfaces 374 and a memory device 376. The memory device 376 may include, for example, one or more volatile and/or non-volatile memories. In other words, for example, the memory device 376 may be an electronic storage device, e.g., a computer readable storage medium, comprising gates configured to store data that may be retrievable by a machine, e.g., a computing device. The memory device 376 may be configured to store information, data, applications, instructions or the like for enabling the apparatus to carry out various functions in accordance with exemplary embodiments of the present invention. For example, the memory device 376 may be configured to buffer input data for processing by the processor 370. Additionally or alternatively, the memory device 376 could be configured to store instructions for execution by the processor 370.

The apparatus 350 may, in some embodiments, be a mobile terminal (e.g., mobile terminal 10) configured to employ an example embodiment of the present invention. However, in some embodiments, the apparatus 350 may be embodied as a chip or chip set. In other words, the apparatus 350 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon.

The apparatus 350 may therefore, in some cases, be configured to implement an embodiment of the present invention on a single chip or as a single "system on a chip." As such, in some cases, a chip or chipset may constitute means for performing one or more operations for providing the functionalities described herein. The processor 370 may be embodied in a number of different ways. For example, the processor 370 may be embodied in hardware as one or more of various processing means such as a coprocessor, a microprocessor, a controller, a digital signal processor (DSP), a processing element with or without an accompanying DSP, or various other processing devices including integrated circuits such as, for example, an application specific integrated circuit (ASIC), an field programmable gate array (FPGA), a microcontroller unit (MCU), a hardware accelerator, a special-purpose computer chip, processing circuitry, or the like. In an example embodiment, the processor 370 may be configured to execute instructions stored in the memory device 376 or otherwise accessible to the processor 370. Alternatively or additionally, the processor 370 may be configured to execute hard coded functionality. As such, whether configured by hardware or software methods, or by a combination thereof, the processor 370 may represent an entity, e.g., physically embodied in circuitry, capable of performing operations according to embodiments of the present invention while configured accordingly. Thus, for example, when the processor 370 is embodied as an ASIC, FPGA or the like, the processor 370 may be specifically configured hardware for conducting the operations described herein. Alternatively, as another example, when the processor 370 is embodied as an executor of software instructions, the instructions may specifically configure the processor 370 to perform the algorithms and/or operations described herein when the instructions are executed. However, in some cases, the processor 370 may be a processor of a specific device, e.g., the mobile terminal 10 or a network device, adapted for employing embodiments of the present invention by further configuration of the processor 370 by instructions for performing the algorithms and/or operations described herein. The processor 370 may include, among other things, a clock, an arithmetic logic unit (ALU) and logic gates configured to support operation of the processor 370.

Meanwhile, the communication interface 374 may be any means such as a device or circuitry embodied in either hardware, or a combination of hardware and software that is configured to receive and/or transmit data from/to a network and/or any other device or module in communication with the apparatus. In this regard, the communication interface 374 may include, for example, an antenna, or multiple antennas, and supporting hardware and/or software for enabling communications with a wireless communication network. In some environments, the communication interface 374 may alternatively or also support wired communication. As such, for example, the communication interface 374 may include a communication modem and/or other hardware/software for supporting communication via cable, digital subscriber line (DSL), universal serial bus (USB) or other mechanisms.

The user interface 372 may be in communication with the processor 370 to receive an indication of a user input at the user interface 372 and/or to provide an audible, visual, mechanical or other output to the user. As such, the user interface 372 may include, for example, a keyboard, a mouse, a joystick, a display, a touch screen, soft keys, a microphone, a speaker, or other input/output mechanisms. In this regard, for example, the processor 370 may comprise user interface circuitry configured to control at least some functions of one or more elements of the user interface, such as, for example, a speaker, ringer, microphone, display, and/or the like. The processor 370 and/or user interface circuitry comprising the processor 370 may be configured to control one or more functions of one or more elements of the user interface through computer program instructions, e.g., software and/or firmware, stored on a memory accessible to the processor 370, e.g., memory device 376, and/or the like.

In an exemplary embodiment, the processor 370 may be embodied as, include or otherwise control a cell/PLMN selection manager 380. As such, in some embodiments, the processor 370 may be said to cause, direct or control the execution or occurrence of the various functions attributed to the cell/PLMN selection manager 380 as described herein. The cell/PLMN selection manager 380 may be any means such as a device or circuitry operating in accordance with software or otherwise embodied in hardware or a combination of hardware and software. The cell/PLMN selection manager 380 may also be a software application, or a set of software executable instructions, executed for example by processor 370. The corresponding functions of the cell/PLMN selection manager 380 are performed as described herein.

The cell/PLMN selection manager 380 may be configured to receive position information indicative of a location of the apparatus 350 relative to a geographic border. The position information may be provided by GPS or other location related information that may be received from the positioning sensor 36 or by any other method (e.g., by manual user entry of the user's position or address). Based on the position information, the cell/PLMN selection manager 380 may be configured to modify a candidate list of cells or PLMNs for cell selection or PLMN selection. In some cases, the modification to the candidate list may include eliminating cells or PLMNs that are on opposite side of the geographic border as the apparatus 350. However, in other examples, the modification to the candidate list may include lowering the prioritization of cells associated with PLMNs that are on the opposite side of the geographic border from the apparatus 350 relative to the cells associated with PLMNs that are on the same side of the geographic border as the apparatus 350. The relative lowering in the prioritization of associated with PLMNs that are on the opposite side of the geographic border from the apparatus 350 may be brought about by moving cells or PLMNs that are on an opposite side of the geographic border as the apparatus 350 to a lower priority level and/or by moving cells or PLMNs that are on the same side of the geographic border as the apparatus 350 to a higher priority level. In some embodiments, the receipt of position information may happen responsive to a request by the apparatus 350 for such information. In some cases, the receipt of position information may only occur responsive to an attempt to place an emergency call. Thus, for example, non-emergency calls may be routed in a typical fashion, without any reference to position information. In cases where a mobile terminal is already registered with a particular PLMN and an emergency call is to be made, the mobile terminal may request location information (or use recent location information already stored at the mobile terminal) to determine if a cross border registration situation exists (e.g., the apparatus 350 is on the opposite side of the border as the PLMN with which it is currently registered). If the cross border registration situation exists, the mobile terminal may perform cell reselection to attempt to eliminate the cross border registration situation prior to placing the emergency call. In some embodiments, the user may be notified of cross border registration situations prior to cell reselection so that the user may confirm that cell reselection to avoid cross border registration for placement of the emergency call is desired. In some examples, the cell reselection may be accomplished, as indicated above, using a list of only those cells that are on the same side of the border as the mobile terminal or with cells that have been prioritized based on their position relative to the border. Thus, in the example of FIG. 4, only PLMN X or PLMN Y may be provided as candidates for selection.

Accordingly, some embodiments of the present invention provide for a mechanism by which calls, such as emergency calls, may be placed using a cell that is associated with a PLMN that is in the same geographic location as the mobile terminal making the call. More specifically, the mobile terminal may make the emergency call via a cell that is on the same side of a geographic border as the mobile terminal in order to ensure that emergency response units dispatched may be those of the geographic area in which the mobile terminal is located rather than strictly being associated with the geographic area from which the mobile terminal is receiving wireless services.

Figure 6:
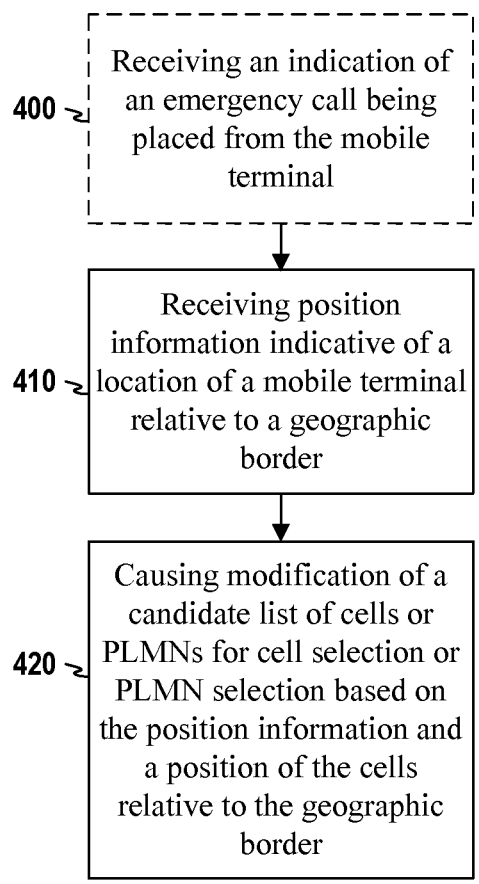
FIG. 6 is a flowchart according to another example method for providing emergency call cell selection according to an example embodiment of the present invention.

FIG. 6 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 6, may include receiving position information indicative of a location of a mobile terminal relative to a geographic border at operation 410, and causing modification of a candidate list of cells or PLMNs for cell selection or PLMN selection based on the position information and a position of the cells relative to the geographic border at operation 420.

In some embodiments, certain ones of the operations above may be modified or further amplified as described below. Moreover, in some embodiments additional optional operations may also be included (an example of which is shown in dashed lines in FIG. 6). It should be appreciated that each of the modifications, optional additions or amplifications below may be included with the operations above either alone or in combination with any others among the features described herein. In this regard, for example, the method may further include receiving an indication of an emergency call being placed from the mobile terminal at operation 400. In an example embodiment, causing modification of the candidate list may include eliminating, from the candidate list, cells associated with a public land mobile network that is on an opposite side of the geographic border as the mobile terminal. In some embodiments, causing modification of the candidate list may include prioritizing the candidate list to lower a prioritization of cells associated with a public land mobile network that is on an opposite side of the geographic border as the mobile terminal. In some cases, receiving the position information may include receiving the position information in response to a request by the mobile terminal. Alternatively or additionally, receiving position information may include determining whether a cross border registration situation exists based on the position information. In some embodiments, causing modification of the candidate list may include causing cell reselection based on a modified candidate list in response to determining that the cross border registration situation exists for an emergency call.

In an example embodiment, an apparatus for performing the method of FIG. 6 above may comprise a processor (e.g., the processor 370) configured to perform some or each of the operations (400-420) described above. The processor may, for example, be configured to perform the operations (400-420) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 400-420 may comprise, for example, the cell selection manager 380 (or respective different components thereof). Additionally or alternatively, at least by virtue of the fact that the processor 370 may be configured to control or even be embodied as the cell selection manager 380, the processor 370 and/or a device or circuitry for executing instructions or executing an algorithm for processing information as described above may also form example means for performing operations 400-420.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   determining, by a mobile terminal and based on position information, that the mobile terminal is located on a first side of a geographic border separating two or more states and/or countries;
   generating, at the mobile terminal, a modified candidate list by at least modifying a candidate list of cells and/or public land mobile networks for cell selection and/or public land mobile network selection, the candidate list being modified to at least prioritize one or more cells that are part of a first public land mobile network located on the first side of the geographic border;
   performing, by the mobile terminal, the cell selection and/or the public land mobile network selection, the performing based at least in part on the modified candidate list; and
   connecting, by the mobile terminal, to the selected cell and/or the selected public land mobile network.

2. The method of claim 1, wherein the prioritizing of the one or more cells comprises eliminating, from the candidate list, cells that are part of a second public land mobile network on a second side of the geographic border.

3. The method of claim 1, wherein the prioritizing of the one or more cells comprises assigning, to cells that are part of a second public land mobile network on second side of the geographic, border a prioritization that is lower than a prioritization assigned to cells that are part of the first public land mobile network on the first side of the geographic border.

4. The method of claim 1, further comprising receiving an indication of an emergency call being placed from the mobile terminal.

5. The method of claim 1, further comprising receiving the position information in response to a request by the mobile terminal.

6. The method of claim 1, further comprising determining whether a cross border registration situation exists based on the position information.

7. The method of claim 6, wherein modifying the candidate list comprises causing cell reselection based on a modified candidate list in response to determining that the cross border registration situation exists for an emergency call.

8. The method of claim 1, wherein the determination that the mobile terminal is located on the first side of the geographic border and the modification of the candidate list occur in response to placement of an emergency call.

9. The method of claim 6, wherein the cross border registration situation exists when the mobile terminal is located on an opposite side of the geographic border from a public land mobile network currently serving the mobile terminal.

10. An apparatus comprising at least one processor and at least one memory including computer program code, the at least one memory and the computer program code configured to, with the at least one processor, cause the apparatus to at least:
    determine, based on position information, that the apparatus is located on a first side of a geographic border separating two or more states and/or countries;
    generate a modified candidate list by at least modifying a candidate list of cells and/or public land mobile networks for cell selection and/or public land mobile network selection, the candidate list being modified to at least prioritize one or more cells that are part of a first public land mobile network located on the first side of the geographic border;

perform, based at least in part on the modified candidate list, the cell selection and/or the public land mobile network selection; and connect to the selected cell and/or the selected public land mobile network.

11. The apparatus of claim 10, wherein the apparatus is further caused to at least prioritize the one or more cells by eliminating, from the candidate list, cells that are part of a second public land mobile network on second side of the geographic border.

12. The apparatus of claim 10, wherein the apparatus is further caused to at least prioritize the one or more cells by assigning, to cells that are part of a second public land mobile network on second side of the geographic border, a prioritization that is lower than a prioritization assigned to cells that are part of the first public land mobile network on the first side of the geographic border.

13. The apparatus of claim 10, wherein the apparatus is further caused to at least receive an indication of an emergency call being placed from the apparatus.

14. The apparatus of claim 10, wherein the apparatus is further caused to at least receive the position information in response to a request by the apparatus.

15. The apparatus of claim 10, wherein the apparatus is further caused to at least receive position information and determine whether a cross border registration situation exists based on the position information.

16. The apparatus of claim 15, wherein the apparatus is further caused to at least modify the candidate list by causing cell reselection based on a modified candidate list in response to determining that the cross border registration situation exists for an emergency call.

17. The apparatus of claim 16, wherein the apparatus is further caused to at least determine that the apparatus is located on the first side of the geographic border and modify the candidate list in response to placement of the emergency call.

18. The apparatus of claim 15, wherein the apparatus is further caused to at least to determine whether the cross border registration situation exists by determining whether the mobile terminal is located on an opposite side of the geographic border from a public land mobile network currently serving the mobile terminal.

19. The apparatus of claim 10, wherein the apparatus comprises a mobile terminal.

20. A computer program product comprising at least one computer-readable storage medium having computer-executable program code instructions stored therein, the computer-executable program code instructions comprising program code instructions to:

determine, by a mobile terminal and based on position information, that the mobile terminal is located on a first side of a geographic border separating two or more states and/or countries;

generate, at the mobile terminal, a modified candidate list by at least modifying a candidate list of cells and/or public land mobile networks for cell selection and/or public land mobile network selection, the candidate list being modified to at least prioritize one or more cells that are part of a first public land mobile network located on the first side of the geographic border;

perform, by the mobile terminal, the cell selection and/or the public land mobile network selection, the performing based at least in part on the modified candidate list; and connect, by the mobile terminal, to the selected cell and/or the selected public land mobile network.

21. The computer program product of claim 20, wherein the prioritizing of the one or more cells comprises eliminating, from the candidate list, cells that are part of a second public land mobile network on second side of the geographic border.

* * * * *